United States Patent [19]

Nussbaumer

[11] 4,111,629

[45] Sep. 5, 1978

[54] CLOSURE DEVICE FOR AN INJECTION MOLDING MACHINE OR INJECTION PRESS

[75] Inventor: Thomas Nussbaumer, Zug, Switzerland

[73] Assignee: Patent & Inventions Ltd., Zug, Switzerland

[21] Appl. No.: 786,685

[22] Filed: Apr. 11, 1977

[30] Foreign Application Priority Data

Apr. 9, 1976 [CH] Switzerland ............... 4506/76

[51] Int. Cl.² ..................... B29F 1/06; B30B 1/00
[52] U.S. Cl. ............. 425/451.2; 415/450.1; 425/590
[58] Field of Search ............ 425/451.2, 425/542, 590, 589, 450.1, DIG. 223; 91/184, 189 A, 170 R; 92/162; 100/269

[56] References Cited

U.S. PATENT DOCUMENTS

| | | | |
|---|---|---|---|
| 3,940,930 | 3/1976 | Rosander | 425/590 X |
| 4,021,181 | 5/1977 | Hehl | 425/450.1 |

FOREIGN PATENT DOCUMENTS

| | | | |
|---|---|---|---|
| 2,147,962 | 3/1973 | Fed. Rep. of Germany | 425/451.2 |
| 46-36,931 | 4/1968 | Japan | 425/542 |

*Primary Examiner*—Francis S. Husar
*Assistant Examiner*—William R. Briggs
*Attorney, Agent, or Firm*—Werner W. Kleeman

[57] ABSTRACT

Closing unit for an injection moulding machine or transfer moulding press with a frame, a first tool carrier rigidly connected therewith, a second displaceable tool carrier and hydraulic displacing devices, which are eccentrically arranged with respect to the tool carriers and of which each has a hollow cylinder fastened to the frame and a piston which is displaceably guided therein and of which each is provided on one side with a first shaft and on the other side with a second shaft. The first shafts are arranged such that they are drawn into the hollow cylinders when the tool carriers are brought nearer to each other, and wherein one each of the two shafts of the pistons is connected rigid with the second tool carrier. According to the invention, at least two pistons are provided, the first shaft of which has a smaller diameter than its second shaft, and there are also provided at least two pistons, the first shaft of which displays a greater diameter than its second shaft. An annular gap is formed between the inside surfaces of the hollow cylinders and the piston, and a valve closing ring, which forms a tight seat with the inside surface of the hollow cylinder as well as also with the second shaft and displays a valve seat facing the piston, is arranged in each hollow cylinder.

6 Claims, 4 Drawing Figures

CLOSURE DEVICE FOR AN INJECTION MOLDING MACHINE OR INJECTION PRESS

BACKGROUND OF THE INVENTION

The invention concerns a closing unit for an injection moulding machine or transfer moulding press with a frame, a first tool carrier connected fast or rigid therewith, a second displaceable tool carrier and hydraulic displacing devices, which are eccentrically arranged with respect to the tool carriers and of which each displays a hollow cylinder fastened to the frame and a piston, which is displaceably guided therein and of which each is provided on the one side with a first shaft and on the other side with a second shaft, wherein the first shafts are arranged in such a manner that they are drawn into the hollow cylinders when the tool carriers are brought nearer to each other, and wherein one each of the tool shafts of the pistons is connected fast with the second tool carrier.

Injection moulding machines or transfer moulding presses for the production of moulded parts of synthetic material or lightweight metal include a closing unit with a locally fixed and a displaceable tool carrier. A respective part of the moulding tool is clamped on to each of the two tool carriers. In the production of a moulded part, the displaceable tool carrier is displaced in a first operating step against the locally fixed tool carrier until the two tool parts touch and the moulding tool is closed. In the next operating step, the moulding mass to be processed is pressed into the tool. Following the pressing-in of the moulded mass is a cooling phase, in which the moulded mass rigidifies. Subsequently, the displaceable tool carrier is again removed from the fixed tool carrier and the moulding tool is opened thereby so that the produced moulded part can be ejected.

In known closing units, the non-displaceable tool carrier is rigidly connected with several rods, the so-called press spars, which run parallel to one another and along which the displaceable tool carrier can be displaced. The latter is connected with the piston of a hydraulic cylinder.

To keep the moulding tool closed during the pressing-in operation, the piston must transmit a very great force on to the displaceable tool carrier. This force can amount to about 1 million kiloponds or more for machines of medium size. Due to the play of the movable elements and due to small deformations, cantings and jammings can be caused, through which the press spars are acted upon with large forces. These forces can become so great that the press spars are destroyed.

Closing units have now already become known, which have no fixed press spars. In such a previously known closing unit, two different kinds of hydraulic displacing devices are present. The fixed tool carrier is provided with four cylinders, which are characteristic of one kind of displacing device and in each of which a piston is displaceably guided, which at both sides has a shaft protruding out of the cylinder. One each of these shafts penetrates a guide of the displaceable tool carrier and is displaceably supported on the machine frame at its end remote from the piston. The shafts penetrating through the guides as well as the displaceable tool carrier are furthermore provided with detent means. These enable the shafts to be connected fast with the displaceable tool carrier before the beginning of the pressing-in of the moulding mass. The pistons are then acted upon with pressure so that they keep the moulding tool closed during the pressing-in of the moulding mass. The closing unit further includes two displacing devices of the other kind, the cylinders of which are connected fast with the displaceable tool carrier. The pistons of these displacing devices display a respective shaft at both sides. The free ends of these shafts are each connected fast with the end of a respective one of the shafts of the first-mentioned displacing devices. The two displacing devices of the second-mentioned kind enable the displaceable tool carrier, when the detent means have not notched in, to be displaced for the opening and closing of the tools. Four displacing devices of the first-mentioned kind are in that case so designed that they make possible only a short displacement, however for this the generation of a large force. The displacing devices of the second-mentioned kind are there-against constructed in such a manner that they make possible a large displacement with relatively small force.

This previously known closing unit has proved itself well with large injection moulding machines, in which very high forces are required. Because the detent-locking required before the pressing-in of the moulding mass as well as the releasing of the detent means required after the pressing-in requires a relatively large amount of time, not such a great number of pieces of moulded parts can be produced per unit time with the previously known closing unit. This is disadvantageous particularly with small machines, in which actually not such great forces are necessary.

SUMMARY OF THE INVENTION

The present invention is now based on the task of creating a closing unit which enables a large number of moulded parts to be produced per unit time without the danger in that case existing that the displaceable tool carrier jams. Furthermore, the closing unit is produceable at favourable costs.

This problem is solved by a closing unit of the initially mentioned kind, which according to the invention is characterized by the features that at least two pistons are present, the first shaft of which has a smaller diameter than its second shaft, that at least two pistons are present, the first shaft of which displays a greater diameter than its second shaft, that an annular gap is present between the inside surface of the hollow cylinders and the piston and that a valve closing ring, which forms a tight seating or seat with the inside surface of the hollow cylinder as well as also with the second shaft and includes a valve seat facing the piston, is arranged in each hollow cylinder.

BRIEF DESCRIPTION OF THE DRAWINGS

The subject of the invention is now explained with reference to an exemplary embodiment illustrated in the drawing. In the drawing,.

DETAILED DESCRIPTION OF THE INVENTION

Figure 1:
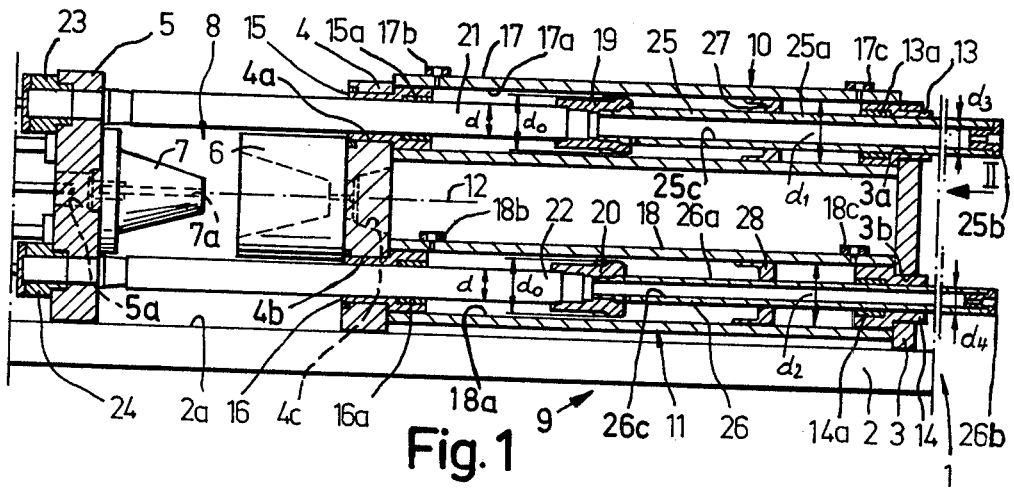
FIG. 1 is a longitudinal section along the line I—I of FIG. 2 through a closing unit in an intermediate position.

The closing unit, illustrated in the four Figures of the drawing, for an injection moulding machine or a transfer moulding press comprises a frame 1 including a pedestal 2, which rests on the floor and on which a vertical plate 3 and a first, locally fixed tool carrier 4 are fastened. The upper surface of the pedestal 2 forms a sliding track 2a for a second, displaceable tool carrier 5, which is arranged on the side of the first tool carrier 4 remote from the plate 3. A respective part 6 and 7 of a moulding tool 8 is fastened to the two tool carriers 4 and 5.

The closing unit includes a hydraulic device 9 for the displacement of the tool carrier 5. The hydraulic device 9 is provided with two first hydraulic displacing devices 10 and two second displacing devices 11. The displacing devices 10 and 11 are arranged eccentrically of the tool carriers 4 and 5, namely in such a manner that the two displacing devices 10 are symmetrical about the central axis 12 of the two tool parts 6 and 7. The two other displacing devices are likewise symmetrical about the central axis 12 of the two tool parts 6 and 7. For the remainder, each of the four displacing devices 10 and 11 has the same spacing from the two adjacent displacing devices and is disposed on one corner of a square.

Figure 4:
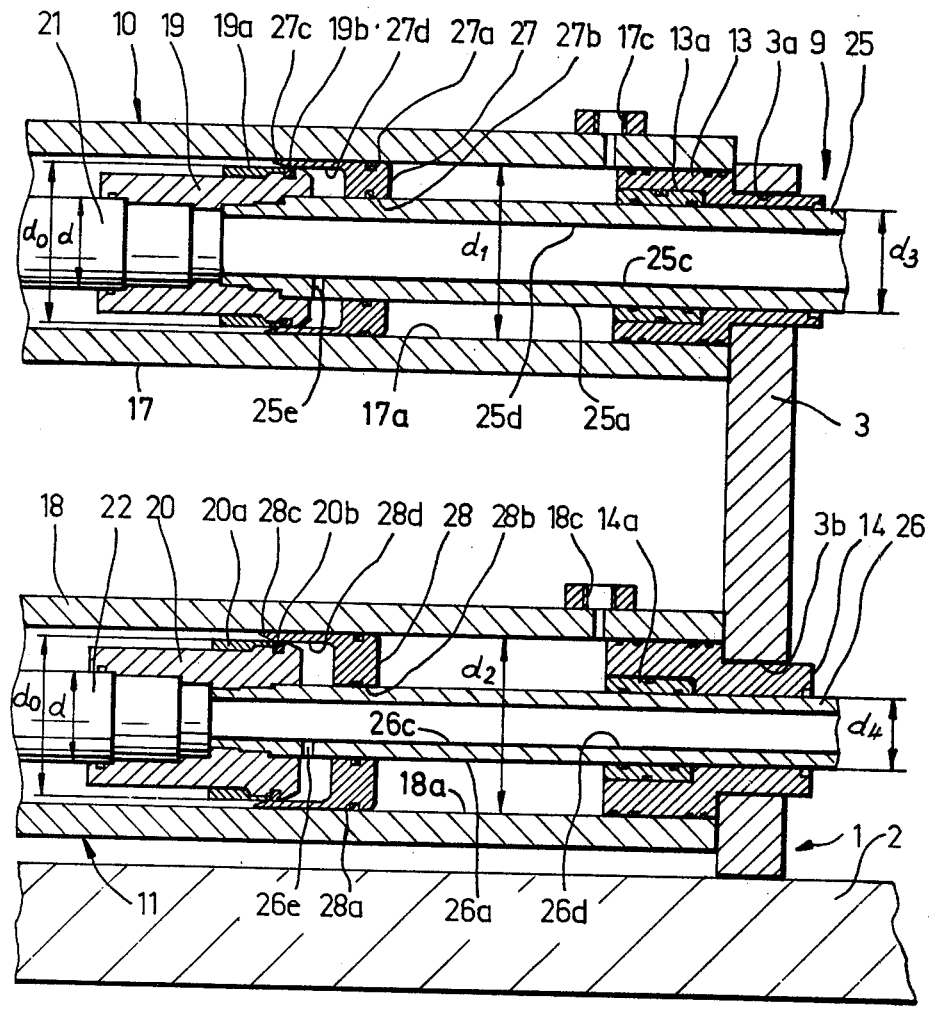
FIG. 4 is a section of FIG. 3 on an enlarged scale.

The plate 3 is provided for each displacing device 10 and 11 with a bore 3a and 3b, respectively, in which a guide sleeve 13 and 14, respectively, is inserted and fastened. The first tool carrier 4 is likewise provided for each displacing device 10 and 11 with a bore 4a and 4b, respectively, in which a guide sleeve 15 and 16, respectively, is inserted and fastened. Each of the guide sleeves 13 and 15 is connected fast and tight with the end of a hollow cylinder 17. Each of the guide sleeves 14 and 16 is connected fast and tight with the end of a hollow cylinder 18. The inside surfaces of the hollow cylinders 17 and 18 are designated by 17a and 18a, respectively. A piston 19 and 20, respectively, with a piston ring 19a and 20a (FIG. 4), respectively, and a sealing ring 19b and 20b, respectively, is arranged in each hollow cylinder 17 and 18. The pistons 19 and 20 are provided on the left-hand side with a first shaft 21 and 22, respectively, having a full cross-section. The shafts 21 and 22 penetrate the guide sleeves 15 and 16, respectively, and are sealed off by bushings 15a and 16a, respectively, inserted in such sleeves and provided with O-rings. The free ends of the first shafts thereof 21 and thereof 22, respectively, protruding out of the hollow cylinders 17 and 18 are fastened by means of threaded nuts 23 and 24, respectively, at the second tool carrier 5. On the right-hand side, the pistons 19 and 20 are provided with a second shaft 25 and 26, respectively. The shafts 25 and 26 penetrate the guide sleeves 13 and 14, respectively, and are sealed off by bushings 13a and 14a, respectively, inserted in such sleeves and including O-rings.

Figure 3:
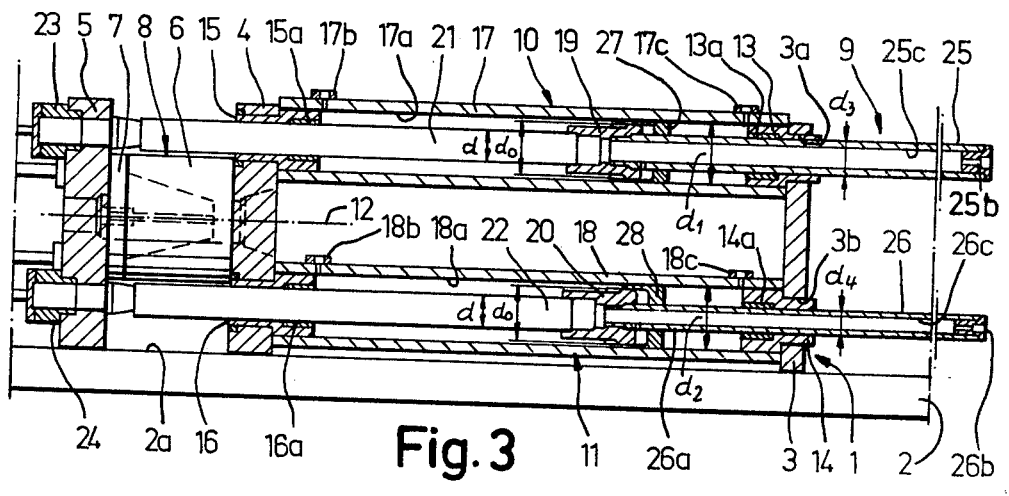
FIG. 3 is a longitudinal section corresponding to FIG. 1 through a closing unit, wherein such is however disposed in the closing position.

A valve closing ring 27 and 28, respectively, is furthermore arranged to be axially displaceable in each hollow cylinder 17 and 18. The outside surfaces 27a and 28a of the closing rings 27 and 28, respectively, are each provided with an O-ring and together with the inside surfaces 17a and 18a, respectively, of the hollow cylinders 17 and 18, respectively, form a tight sliding fit. The inside surfaces 27b and 28b of the valve closing rings 27 and 28, respectively, are likewise each provided with an O-ring and together with the outside surfaces 25a and 26a, respectively, of the second shafts 25 and 26, respectively, form a tight sliding fit. The valve closing rings 27 and 28 each also have a hollow cylindrical collar 27c and 28c, respectively, confronts the piston 19 and 20, respectively. When the closing unit is disposed in its closing position illustrated in FIGS. 3 and 4, the cylindrical inside surfaces 27d and 28d of the collars 27c and 28c, respectively, form a valve seat for the piston 19 and 20, respectively, namely a tight sliding fit together with the piston rings 19a and 20a, respectively, and the sealing rings 19b and 20b, respectively.

Each hollow cylinder 17 and 18 is provided with a hydraulic means connection 17b and 18b, respectively, in the proximity of its end disposed at the left and with a hydraulic means connection 17c and 18c, respectively, in the proximity of its end disposed at the right. Each of the second shafts 25 and 26 is provided at its free end with a hydraulic means connection 25b and 26b, respectively. The two connections 25b and 26b are connected with a hydraulic means passage 25c and 26c, respectively. The passages 25c and 26c are formed by an axial bore 25d and 26d, respectively, and a radial bore 25e and 26e, respectively. The radial bores 25e and 26e are disposed on the right-hand sides of the pistons 19 and 20, respectively, and thus open out into the interior space of the hollow cylinder 17 and 18, respectively, on the side of the valve closing ring 27 and 28, respectively, facing the piston 19 and 20, respectively.

The hydraulic means connections 17b, 17c, 25b, 18b, 18c and 26b are connected by ducts with a not illustrated hydraulic control unit, which includes a reservoir, a pressure pump and valves. Furthermore, various electrical limit switches and pressure sensors are provided.

The outside diameters of the first shafts 21 and 22 are all equal and are designated by $d$. The outside diameters of the piston rings 19a and 20a forming the outside surfaces of the pistons are likewise all equal, namely, greater than $d$ and designated by $d_o$. The diameters $d_1$ and $d_2$ of the inside surfaces 17a and 18a, respectively, of the hollow cylinders 17 and 18, respectively, are greater than the outside diameters $d_0$ of the pistons, so that a free annular gap, which corresponds to the wall thickness of the collars 27c and 28c, respectively, is present between the outside surfaces of the pistons 19 and 20, respectively, and the inside surfaces of the hollow cylinders 17 and 18, respectively. For the remainder, the diameter $d_1$ is somewhat smaller than the diameter $d_2$. The outside diameters of the second shafts 25 and 26 are designated by $d_3$ and $d_4$, respectively. In that case, $d_3$ is greater than $d$ and $d$ is greater than $d_4$. For the remainder, the diameters are so determined that the ratio of cross-sectional areas between the annular gap present between the pistons 19 and 20 and the inside surfaces 17a and 18a of the hollow cylinder and the annular surface disposed between the second shaft 25 and 26 and the inside surfaces 17a and 18a of the hollow cylinder is equally great in all displacing devices 10 and 11. In the present case, the diameters fulfill the relationship:

$$(d_1^2 - d_3^2)/(d_1^2 - d_0^2) = (d_2^2 - d_4^2)/(d_2^2 - d_0^2) = k. \tag{1}$$

In that case, $k$ is a constant, which, for example, has approximately the value 5.

The first tool carrier 4 is provided with an opening 4c, which is coaxial with the axis 12 and into which the not shown injection nozzle projects. The second tool carrier 5 and the tool part 7 are provided with an opening 5a and 7a, respectively. Fastened to the second tool carrier is an only partially illustrated hydraulic ejector device, which displays a pin to eject the produced moulder parts through the openings 5a and 7a from the tool part 7.

The mode of operation of the closing unit shall now be explained in the following.

It is first assumed that the closing unit is fully open. The pistons 19 and 20 are then disposed at the left-hand ends of the hollow cylinders 17 and 18, respectively, and bear against the guide sleeves 15 and 16, respectively.

Now, the moulding tool 8 is to be closed. For this, the valves in the ducts to the hydraulic means connections 17b, 17c, 18b and 18c are closed. Hydraulic means disposed under pressure are fed to the connections 25b. Connections 26b are connected with a reservoir of the control unit so that the hydraulic means can flow out freely. In the two first displacing devices 10, the hydraulic means fed through the connection 25b now flows on the left-hand side of the valve closing ring 27 into the interior space of the hollow cylinder 17 to both sides of the piston 19, as is evident from the FIG. 1. Each piston 19 is now acted upon by a force directed towards the right and equal to the product:

$$p (d_3^2 - d^2) \pi/4. \qquad (2)$$

In that case, p designates the pressure of the hydraulic means. The second tool carrier 5 is thus displaced to the right, whilst the total force is equal to twice the force given by the formula (2). Since the connections 17b, 17c, 18b and 18c are closed, the valve closing rings 27 and 28 remain unmoved. Since, of course, also the pistons 20 of the two second displacing devices 11 displace to the right, hydraulic means is urged out of the hollow cylinders 18 through the connections 26b.

Since only relatively small forces are required during the closing, the difference between the diameters $d_3$ and $d$ can be relatively small. Only a relatively small quantity of hydraulic means is then required for the closing so that the second tool carrier 5 can be displaced fairly rapidly towards the first tool carrier 4.

When the second tool carrier 5 has now reached its closing position, in which it touches the first tool carrier 4, a signal is generated by a limit switch. The connections 17b and 18b still remain closed. Thereagainst, hydraulic means disposed under pressure is now fed by the pressure pump to the connections 17c and 18c. Each connection 25b is connected with the reservoir through a valve which maintains a constant pressure in the passage 25c. Each connection 26b furthermore remains connected directly with the reservoir. Now, the valve closing rings 28 first displace to the left. In that case, hydraulic means is urged outwardly through the passages 26c and the connections 26b. When the valve closing ring 28 of each of the two first displacing devices 11 reaches the position illustrated in the FIGS. 3 and 4, it together with the piston 20 blocks the passage 26c from the interior space of the hollow cylinder 18. The pressure of the hydraulic means fed to the connections 17c and 18c now rises until the valve closing rings 27 of the two first displacing devices 10 likewise displace to the left. In that case, hydraulic means is pressed out through the passages 25c and the connections 25b as well as the mentioned valve until the valve closing rings 27 likewise reach the position illustrated in the FIGS. 3 and 4 and block off the passages 25c. When the pressure now rises still somewhat further, the valve closing rings 27 and 28 are urged still a little further to the left against the pistons. Since the ducts leading to the connections 17b and 18b are closed, the displacement of the valve closing rings 27 and 28 effects an increase of the pressure at the left of the collars 27c and 28c. The ratio between the pressure at the left of the collars 27c and 28c and the pressure at the right of the valve closing rings 27 and 28 is in that case equal to the constant k defined by the relationship (1) and also equal for all four displacing devices 10 and 11. The pressure increase taking place at the left of the collars 27c and 28c has the effect that the pistons 19 and 20 are acted upon by a force directed to the right, whereby a preliminary stage of this so-called latching is initiated.

When the pressure at the connections 17c and 18c has reached a predetermined upper limit value, an electrical signal is generated by a pressure sensor. This now triggers the actual latching. In that case, hydraulic means disposed under pressure is fed to the connections 17b and 18b. The valves and the ducts to the connections 17c and 18c are closed. The connections 25b and 26b are connected directly with the reservoir. The collars of the valve closing rings 27 and 28 are acted upon by the hydraulic means fed through the connections 17b and 18b with a force directed to the right. Since however the ducts to the connections 17c and 18c are closed, a counter-pressure smaller by the constant k sets in on the right-hand side of the valve closing rings, so that the valve closing rings approximately retain their position. Since all pistons 19 and 20 have the same diameter $d_0$ and all first shafts 21 and 22 have the same diameter $d$, the difference between the cross-sectional area of the piston 19 and 20 and that of the first shaft 21 and 22 is equally great in all displacing devices 10 and 11. When p designates the pressure of the hydraulic means fed to the hydraulic means connections 17b and 18b, then the same force F directed to the right is exerted on each piston 19 and 20, the magnitude of the force being given by the formula:

$$F = p (d_0^2 - d^2) \pi/4. \qquad (3)$$

These forces are now transmitted by the shafts 21 and 22 to the second tool carrier 5. When one now injects the moulding mass into the moulding tool 8, the second tool carrier 5 is urged against the first tool carrier 4 with the total force 4F. This total force can be maintained over that portion of displacement travel, through which the pistons 19 and 20 are displaceable within the collars 27c and 28c. The possibility of displacing the second tool carrier 5 somewhat at approximately constant force makes possible the compensation of inaccuracies. Additionally, this possiblity of displacement is of advantage particularly when the employed moulding tool 8 contains resilient elements so that certain parts displace during the injection process.

After the injection of the moulding mass, the two parts 6 and 7 of the moulding tool 8 must at first again be separated from one another. For this, fairly large forces are likewise required. In this phase, which may be designated as unlatching, the connections 17b and 18b are conductingly connected directly with the reservoir. The ducts leading to the connections 17c and 18c are blocked by valves. Hydraulic means at the pressure p is fed to the connections 25b and 26c. Each piston 19 of the two first displacing devices 10 is now acted upon by a force $F_1$, which is directed to the left and the size of which is given by the formula $$F_1 = p(d_0^2 - d_3^2)\pi/4. \quad (4)$$

Each piston 20 is acted upon with a force $F_2$, which is directed to the left and the size of which is given by the formula $$F_2 = p(d_0^2 - d_4^2)\pi/4. \quad (5)$$

These forces are now transmitted to the second tool carrier 5. Since $d_3$ is somewhat greater than $d_4$, the forces are not exactly equal. Since however two first displacing devices 11 are diagonally opposite one another, this hardly entails disadvantages.

When now one or more of the pistons 19 and 20 moves out of the collar 27c and 28c of the valve closing ring 27 and 28 concerned, the hydraulic means can flow out freely into the reservoir through the connection 17b or 18b concerned. This has the consequence of a collapse of the pressure at the connections 25b and 26c. This pressure collapse is ascertained by a pressure sensor which now generates a signal.

The opening phase is initiated by this signal. During this opening phase, the feed ducts to the connections 17b, 17c, 18b and 18c are blocked. The connections 25b are connected directly with the reservoir. Hydraulic means disposed under the pressure $p$ is fed to the connections 26b. It is evident from FIG. 1 that each piston 20 is now acted upon by a force which is given by the product:

$$p(d^2 - d_4^2)\pi/4. \quad (6)$$

The pistons 19 and 20 and the second tool carrier 5 are displaced towards the left. In that case, hydraulic means flows outwards into the reservoir through the connections 25b. The quantities of hydraulic means in that case flowing in and out, respectively, are relatively small as during the closing process so that the tool carrier 5 is moved away from the tool carrier 4 at relatively great speed.

During the opening process, the produced moulded part is ejected from the tool part 7 by means of the ejector device. When the pistons 19 and 20 reach the left-hand ends of the hollow cylinders 17 and 18, a signal is generated by a limit switch. The control unit then starts a new cycle.

In this manner, it is possible to produce moulded parts at great speed. For example, about 30 to 40 moulded parts with a weight of about 30 grammes can readily be produced per minute.

The closing unit can readily be used for different moulding tools. When the moulding tool is now perhaps exchanged, the valve closing rings 27 and 28 must be brought into the correct position in a preparatory step. For this purpose, it is effected by means of a manually actuable switch that the feed ducts to the connections 17b and 18b are blocked and the feed ducts to the connections 17c and 18c are connected directly with the reservoir. Hydraulic means disposed under slight pressure is fed to the connections 25b and 26b. The valve closing rings 27 and 28 now displaces to the right. When they reach the right-hand ends of the hollow cylinders 17 and 18, i.e. the guide sleeves 13 and 14, a signal is generated by a limit switch and the feed of hydraulic means is broken off.

Now, the tool 8 can be closed in the normal manner described further forward. After the attainment of the closing position, the valve closing rings 27 and 28 are displaced to the left, as described, during which they automatically get into the correct position.

When the tool part 7 on closing is always disposed in the same position, the displacement of the valve closing rings can also be dispensed with during the repetitions of the operating cycle.

The closing unit enables, as already mentioned, a large number of moulded parts to be produced per unit time. Furthermore, it has the advantage that a large part of the elements of the displacing devices 10 and 11 are rotationally symmetrical and can be produced largely by turning. This makes it possible to keep the production costs relatively low.

For the remainder, the closing unit can be modified in different aspects. For example, more than two first and second displacing devices 10 and 11 can be provided.

Figure 2:
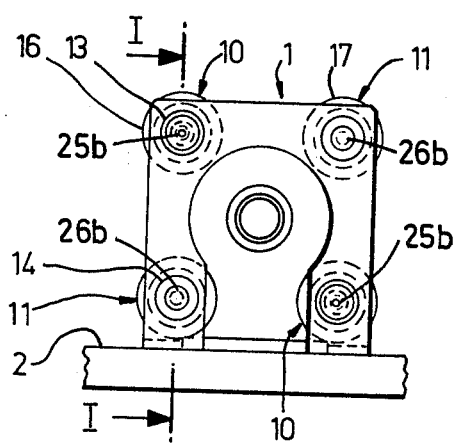
FIG. 2 is a view of the closing unit looking in the direction designated by the arrow II in FIG. 1.

Furthermore, it would be quite possible to fasten the second tool carrier not to the first shafts, but to the second shafts. In this case, both tool carriers would of course have to be arranged on the right-hand side of the hollow cylinders in the FIGS. 1 and 2. Furthermore, the four displacing devices could be arranged, instead of at the corners of a square as in the described example of embodiment, at those of a rectangle.

While there are shown and described present preferred embodiments of the invention, it is to be distinctly understood that the invention is not limited thereto, but may be otherwise variously embodied and practiced within the scope of the following claims. Accordingly,

What I claim is:

1. In a closing unit for an injection moulding machine or transfer moulding press with a frame (1), a first tool carrier (4) fixedly connected therewith, a second displaceable tool carrier (5) and hydraulic displacing devices (10, 11), which are eccentrically arranged with respect to the tool carriers (4, 5) and of which each displacing device (10, 11) possesses a hollow cylinder (17, 18) fastened to the frame (1) and a piston (19, 20), which is displaceably guided in the hollow cylinder (17, 18), each piston (19, 20) being provided on one side with a first shaft (21, 22) and on the other side with a second shaft (25, 26), wherein the first shafts (21, 22) are arranged in such a manner that they are drawn into the hollow cylinders (17, 18) when the tool carriers (4, 5) are brought nearer to each other, and wherein one each of the two shafts (21, 22, 25, 26) of the pistons (19, 20) is fixedly connected with the second tool carrier (5), the improvement which comprises: that at least two first pistons (19) are provided in respective hollow cylinders (17), the first shaft (21) of each first piston (19) having a smaller diameter than its associated second shaft (25), that at least two second pistons (20) are, provided in respective hollow cylinders (18), the first shaft (22) of each second piston (20) having a greater diameter than its associated second shaft (26), all said first shafts (21, 22) being connected with the second tool carrier (5), each hollow cylinder (17, 18) having an inside diameter (17a, 18a) greater than the outside diameter of the respective first and second piston (19, 20) associated therewith, the difference between each cylinder diameter and its associated piston diameter defining an annular gap therebetween and a valve closing ring (27, 28) arranged in each hollow cylinder (17, 18) between the inside diameter (17a, 18a) of such cylinder and the outside diameter of the second shaft (25, 26) of the piston associated with such cylinder, means forming a seal between each valve closing ring (27, 28) and the inside diameter (17a, 18a) of the cylinder (17, 18) associated therewith and between each valve closing ring (27, 28) and the second shaft (25, 26) of the piston associated with such cylinder, each valve closing ring (27, 28) having valve seat means (27d, 28d) for sealingly engaging the piston (19, 20) associated therewith.

2. The closing unit according to claim 1, wherein, each valve closing ring (27, 28) is displaceably guided in its respective hollow cylinder (17, 18).

3. The closing unit according to claim 1, wherein, all first shafts (21, 22) have the same diameter (d).

4. The closing unit according to claim 1, wherein each valve closing ring (27, 28) is provided with a collar (27c, 28c) corresponding to the size of the annular gap, the collar (27c, 28c) of each valve closing ring (27, 28) having a cylindrical inside surface (27d, 28d) which forms the valve seat means and a sliding fit with the piston (19, 20) associated therewith.

5. The closing unit according to claim 1, wherein, the difference between the cross-sectional area of the piston (19, 20) and that of the first shaft (21, 22) is equal in all displacing devices (10, 11).

6. The closing unit according to claim 1, wherein, the ratio of cross-sectional areas between the annular gap present between the piston (19, 20) and the inside surface (17a, 18a) of the hollow cylinder and the annular area disposed between the second shaft (25, 26) and the inside surface (17a, 18a) of the hollow cylinder is equal in all displacing devices (10, 11).

* * * * *